UNITED STATES PATENT OFFICE.

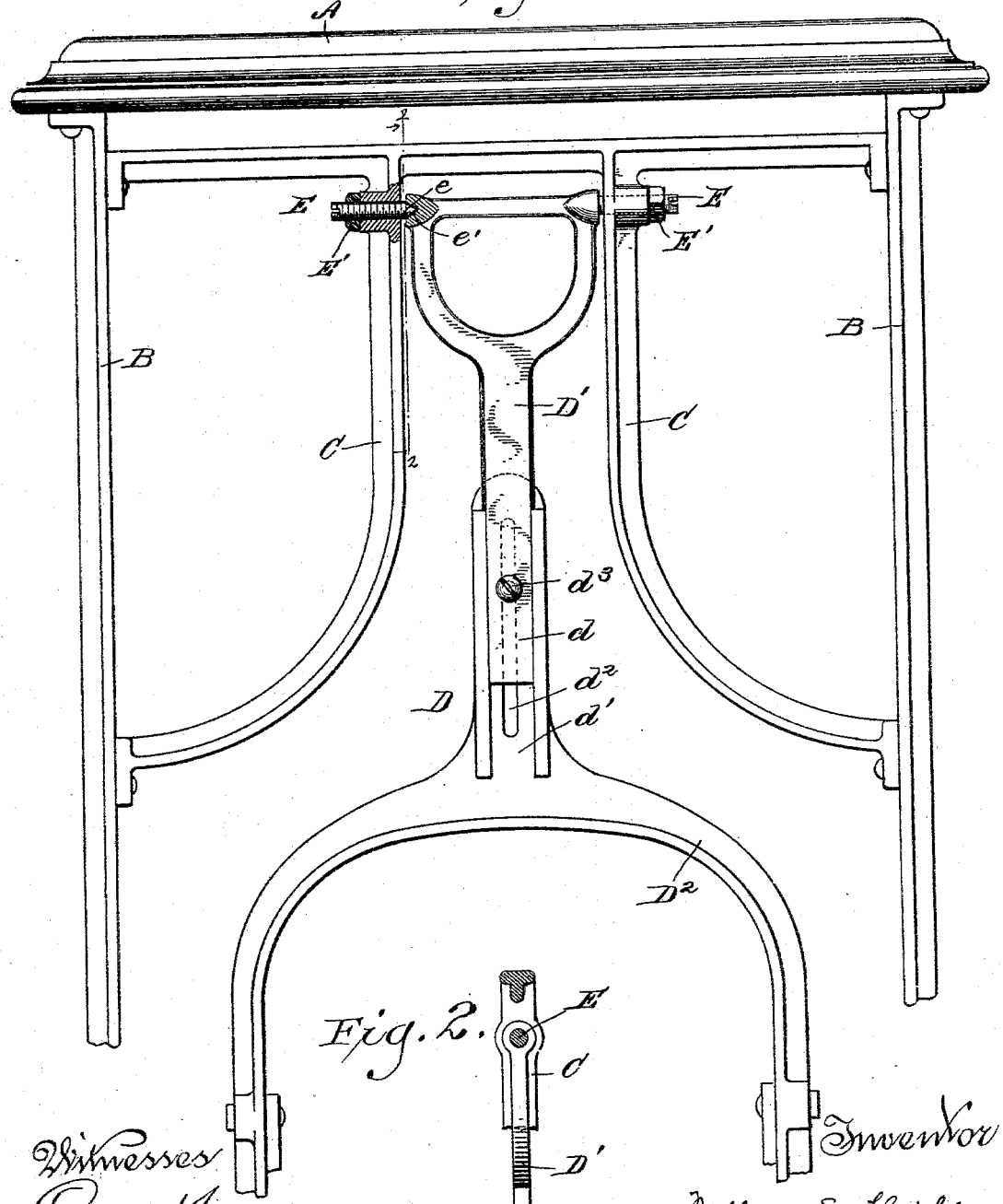

WILLIAM E. SLEIGHT, OF MILWAUKEE, WISCONSIN, ASSIGNOR TO THE UNITED STATES SWING TREADLE COMPANY, OF SAME PLACE.

SUSPENSION DEVICE FOR SWINGING TREADLES.

SPECIFICATION forming part of Letters Patent No. 494,748, dated April 4, 1893.

Application filed December 29, 1891. Serial No. 416,463. (No model.)

*To all whom it may concern:*

Be it known that I, WILLIAM E. SLEIGHT, a citizen of the United States, and a resident of Milwaukee, in the county of Milwaukee and in the State of Wisconsin, have invented certain new and useful Improvements in Suspension Devices for Swinging Treadles; and I do hereby declare that the following is a full, clear, and exact description thereof.

My invention relates to new and useful improvements in swinging treadles for sewing machines, and relates more particularly to improvements in suspension devices for connecting treadles of this class with the machines.

The various features of my invention will be more fully hereinafter described and pointed out in the appended claims.

In the accompanying drawings illustrating my invention:—Figure 1. is a front elevation, partly in section, of a swinging treadle embodying my invention. Fig. 2. is a detail view of one of the parts.

In said drawings: A represents the table or top of the machine, B B the legs, C C frame pieces or braces extending between said legs and D the suspension device for connecting the swinging treadle with the machine frame. This suspension device D preferably comprises two sections D' and D², adjustably engaged with each other the upper end of the section D' being engaged with the frame in any suitable manner, and the lower section being adapted for engagement with the treadle.

In the particular form of construction illustrated in the drawings, the upper section D' of the suspension device or hanger D is pivotally engaged with vertical portions of the frame pieces C C by means of suitable screws or pins E E provided with conical points $e$ $e$ adapted for engagement with similarly shaped recesses $e'$ $e'$ in opposite sides of the upper end of said section D' of the hanger. These screws or pins E E are conveniently threaded through suitable apertures in the frame pieces C C as shown, and lock nuts E' E' are preferably located upon the outside ends of said screws and arranged to engage with the outer surfaces of the said frame pieces so as to firmly secure said screws in position. By this construction, the conical bearings by which the hanger is engaged with the frame, may be adjusted so as to prevent any lateral play and to hold the parts very firmly in position, while at the same time, a very free swinging movement of the hanger is permitted.

In the particular form of construction illustrated in the drawings, the upper and lower sections of the hanger are connected together by means of a sliding dove tail engagement comprising a tongue or strip $d$ extending downward from the lower end of the upper section D' and engaged with a groove or channel $d'$ in the upper end of the lower section D². A slot $d^2$ is provided in one of the parts and a screw or bolt $d^3$ is passed through said parts to clamp the same together. By this construction, the hanger may be adjusted to the proper length to suit any style of machine frame.

It will be seen that my improved form of suspension device or hanger may be easily adapted for use in connection with the ordinary forms of machine frames, it being only necessary to provide the screw threaded apertures in the frame pieces and to pass the screws E E through said apertures and to engage the same with the recesses or depressions $e'$ $e'$ in the upper end of the section D' of the hanger in the manner described.

This form of suspension device is equally well adapted for use upon sewing machines, scroll saws, lathes and all kinds of foot power machines, and is at once simple and cheap in construction, and strong and durable.

Having thus described my invention, what I claim as new, and desire to secure by Letters Patent of the United States, is—

The combination with the top and the treadle of a foot power machine, of a suspension device comprising an upper section adapted for pivotal engagement with the machine frame and provided with a depending dove tail tongue or strip, a lower section bifurcated at its lower end and adapted to embrace the treadle, and provided with an upwardly extending shank having a dove tail channel or groove adapted for adjustable engagement with said tongue or strip, there being a slot in one of said parts, and a bolt for securing them together in their adjusted positions, substantially as set forth.

In testimony that I claim the foregoing I have hereunto set my hand, at Milwaukee, in the county of Milwaukee and State of Wisconsin, in the presence of two witnesses.

WILLIAM E. SLEIGHT.

Witnesses:
JOHN E. WILES,
MATT. F. WARNER.